Figure 1:
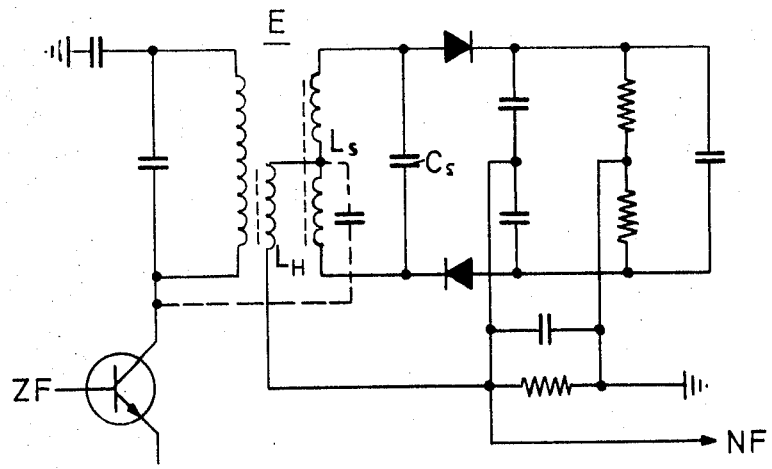

United States Patent

[11] 3,588,721

| [72] | Inventors | Hans Keller;<br>Fritz Lowel, both of Freiburg, Germany |
| --- | --- | --- |
| [21] | Appl. No. | 821,425 |
| [22] | Filed | May 2, 1969 |
| [45] | Patented | June 28, 1971 |
| [73] | Assignee | International Telephone and Telegraph Corporation<br>Nutley, N.J. |
| [32] | Priority | May 4, 1968 |
| [33] | | Germany |
| [31] | | P 17 66 326.2 |

[54] DEMODULATOR FOR FREQUENCY MODULATED SIGNALS
3 Claims, 2 Drawing Figs.

[52] U.S. Cl. .................................................. 329/129,
307/233, 325/349, 329/137
[51] Int. Cl. ................................................ H03d 3/10
[50] Field of Search............................................ 329/129,
130, 137, 138; 307/233; 325/349, 487

[56] References Cited

UNITED STATES PATENTS

| 2,520,621 | 8/1950 | Beers............................ | 329/138 |
| 2,497,840 | 2/1950 | Seeley........................... | 329/130 |
| 2,873,365 | 2/1959 | Janssen......................... | 329/138X |
| 3,290,608 | 12/1966 | Gschwandtner............... | 329/129X |

*Primary Examiner*—Alfred L. Brody
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: A ratio detector arrangement in which the usual transformer with tuned primary and secondary, is replaced by a tuned L-C circuit with the C consisting of two capacitors connected in series and the input applied between them. A smaller capacitor by a factor of 10 connects one end of the L-C circuit to ground. In a conventional manner the opposite ends of the L-C circuit are connected via two oppositely poled diodes respectively across two circuits, one consisting of two capacitors in series and the other of two resistors in series, to the opposite sides of a large capacitor. Output is taken from the midpoint of the two series circuits via a smoothing network. A resistor connects one end of the L-C circuit to the smoothing network.

Patented June 28, 1971  3,588,721

INVENTORS
HANS KELLER
FRITZ LÖWEL
BY Charles T. Johnson
ATTORNEY

DEMODULATOR FOR FREQUENCY MODULATED SIGNALS

The present invention relates to a ratio detector for demodulating a frequency-modulated RF voltage.

The demodulating circuit for frequency-modulated oscillations referred to as a ratio detector, is known from quite a number of publications. From the great number of these publications reference is made herein to "Radio Mentor," June 1949, pp. 280—284, 286, 288, and "Valvo Berichte," Nov. 1956, pp. 159—196. The circuit principle of the known ratio detector will now be briefly explained with reference to FIG. 1 of the accompanying drawings. The circuit contains a frequency-sensitive input circuit E, two resonant circuits which are in such a way magnetically coupled to one another that the voltage at the secondary circuit is phase-shifted on an average by 90° with respect to that of the primary circuit. Moreover, the center tap of the secondary circuit $L_sc_s$ is connected to a coupling coil $L_H$ of the primary circuit, so that in the case of a resonance frequency, equally high AC voltages are applied to the demodulator diodes, which voltages are composed of a vectorial addition of the primary voltage and of respectively half the secondary voltage.

Since the two diodes are oppositely polarized, the directional currents thereof will in this particular case annul each other in the output resistance.

A frequency modulation of the input signal displaces the phase of the voltage induced in the secondary circuit, with the resulting voltages at the demodulator diodes respectively being changed in opposite directions. The thus appearing difference in the directional currents will result in the frequency-dependent intermediate frequency-output signal.

For the purpose of suppressing AM noise signals, the output electrodes of the two diodes are connected to an electrolytic capacitor which keeps constant the sum of both directional voltages with respect to short amplitude variations.

There is also still known another variety of the ratio detector in which as a rigid coupling circuit between the primary and the secondary circuit of the ratio detector there is arranged an additional capacitance which is connected between the hot end of the primary circuit and the center tap of the inductance $L_S$ of the secondary circuit of the band-pass filter, as is indicated by the dashline in FIG. 1 showing the known type of circuit. In cases where this type of fixed coupling is provided, the coupling coil $L_H$ may be omitted.

To the secondary circuit of the frequency-sensitive input circuit E there is connected a rectifier circuit consisting of two diodes, as well as of some capacitors and some resistors, at the output of which the demodulated intermediate frequency-voltage may be taken off.

As may be taken from the great number of literature passages concerning the ratio detector of this kind, the adjusting and dimensioning of the three inductances of the band-pass filter is extremely critical, so that this band-pass filter represents the most expensive component of a ratio detector and, also because three different coils have to be wound.

It is one object of the present invention to provide a ratio detectorlike circuit arrangement which can be used for the demodulation of frequency-modulated oscillations which is of a substantially more simple design and whose electrical properties, however, in particular as regards AM suppression and the discriminator curve, reaches the values set by the conventional ratio detector.

In accordance with the present invention there is provided a ratio detector circuit for frequency modulated signals comprising a source of frequency modulated signals, a resonant circuit consisting of an inductance and a divided capacitance in parallel, said source being connected to the midpoint of said capacitance, a pair of capacitors connected in series, a pair of resistors connected in series, a pair of reversely polarized diodes respectively connecting opposite ends of said resonant circuit across said pair of capacitors and said pair of resistors, means for applying a bias to said diodes, a coupling capacitor connected between one end of the resonant circuit and a reference potential, the midpoint of said pair of resistors likewise being connected to said reference potential, and an output circuit connected between the midpoint of said pair of capacitors and said reference potential.

In the embodiment of FIG. 1 the coil $L_H$ is closely coupled to the primary. Therefore, the voltage induced in the coil $L_H$ is 0° or 180° out-of-phase with that in the primary according as the coil is connected to the midpoint with respect to its winding sense. This voltage serves as reference voltage for the voltage induced in the coil $L_S$. On the contrary, the coil $L_S$ is loosely coupled to the primary so that the voltage induced is 90° out-of-phase with that in the primary.

Figure 2:
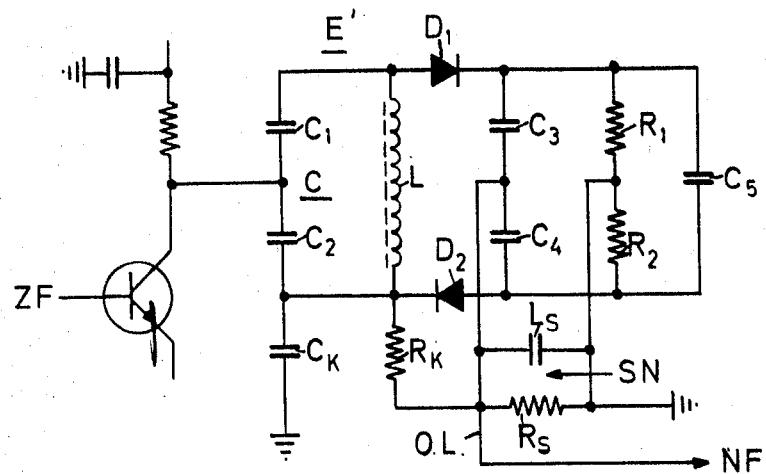

In the inventive arrangement according to FIG. 2 the close coupling of the coil $L_H$ is replaced by the direct coupling to the midpoint of the capacitances $C_1$ and $C_2$. The loose coupling is realized by the capacitance $C_K$ being smaller by a factor 10 as the capacitances $C_1$ or $C_2$. Thus, the voltage generated by $C_K$ is also 90° out-of-phase with that at the midpoint of the capacitances $C_1$ and $C_2$. Therefore, in the inventive ratio detectorlike circuit the known vector diagram of the induced voltages is the same as in the known circuit using a bandfilter.

Referring now to FIG. 2, the input circuit E of the demodulator consists of the parallel resonant circuit LC. To the output thereof there is connected the well known rectifier circuit with subsequently arranged smoothing means, and at the output thereof there may be taken off the low frequency (LF) voltage. In the inventive way the circuit capacitance C of the parallel resonant circuit is divided, i.e. the circuit capacitance C consists of the two series-connected preferably equally large capacitors $C_1$ and $C_2$. To the point connecting these two capacitors there is fed the frequency-modulated RF voltage. This, for example, may be the output voltage of the last stage of an IF amplifier ZF. Moreover, according to the present invention, one end of the parallel resonant circuit is connected via the coupling capacitor $C_K$, to reference potential (ground). It is of advantage with respect to the dimensioning of both the circuit capacitance and the coupling capacitor to design the coupling capacitor to be smaller than the circuit capacitance. It is particularly favorable in dimensioning the circuit capacitance C and the coupling capacitor $C_K$ to make the coupling capacitor smaller, by the factor 10, than the circuit capacitance.

For the purpose of establishing a DC connection between the parallel resonant circuit and the smoothing circuit which is arranged subsequent to the rectifier circuit, there is provided the resistor $R_K$ serving to connect one of the two ends of the parallel resonant circuit to the tap of the LF voltage (output lead O.L.). Moreover, this resistor offers the advantage of damping any possible low frequency noise portions of the frequency-modulated RF voltage.

Outside the frequency-sensitive circuit E' of FIG. 2, the rest of the ratio detector circuit is similar to that of FIG. 1. It includes a pair of capacitors $C_3$ and $C_4$ connected in series and a pair of resistors $R_1$ and $R_2$ likewise connected in series. The two ends of the resonant circuit are connected via oppositely polarized diodes $D_1$ and $D_2$ across said pair of capacitors and said pair of resistors. One output lead, O.L., is taken between the capacitors $C_3$ and $C_4$, and the midpoint between resistors $R_1$ and $R_2$ is connected to reference potential (ground). A smoothing network SN consisting of a capacitor $L_S$ and a resistor $R_S$ is connected across the output circuit. A large capacitor $C_5$ is connected at one end to the cathode of diode $D_1$ and the anode of diode $D_2$ and serves as a means to bias these diodes so as to keep constant the sum of both directional voltages across the series capacitors with respect to slow amplitude variations.

This ratio-detectorlike circuit arrangement offers particular advantages when used in such cases where the IF amplifier and the subsequently arranged rectifier circuit exist in the form of an integrated circuit, for example, as a monolithically integrated circuit or as a circuit designed in accordance with the hybrid, thick-film or thin-film-techniques.

We claim:

1. A ratio detector circuit for frequency modulated signals comprising:
   a source of frequency-modulated signals;
   a resonant circuit consisting of an inductor and a divided capacitor in parallel, said source being connected to the midpoint of said capacitor;
   a pair of capacitors connected in series;
   a pair of resistors connected in series;
   a pair of reversely polarized diodes respectively connecting opposite ends of said resonant circuit across said pair of capacitors and said pair of resistors;
   means for applying a bias to said diodes;
   a coupling capacitor connected between one end of the resonant circuit and a reference potential, the midpoint of said pair of resistors likewise being connected to said reference potential;
   an output circuit connected between the midpoint of said pair of capacitors and said reference potential; and
   a resistor connected between the midpoint of said pair of capacitors and the end of said resonant circuit which is connected to the coupling capacitor.

2. A ratio detector according to claim 1, wherein said coupling capacitor is smaller by a factor of 10 than the resonant circuit capacitor.

3. A ratio detector according to claim 1, wherein said output circuit includes a smoothing network.